United States Patent [19]

Shoji et al.

[11] Patent Number: 4,635,770
[45] Date of Patent: Jan. 13, 1987

[54] ONE-WAY CLUTCH ROLLING MEMBER HOLDER AND ONE-WAY CLUTCH HAVING THE HOLDER

[75] Inventors: Masao Shoji, Fujisawa; Mikio Uchida, Yamato; Yoshio Kinoshita, Ayase, all of Japan

[73] Assignee: NSK-Warner K.K., Tokyo, Japan

[21] Appl. No.: 689,948

[22] Filed: Jan. 9, 1985

[30] Foreign Application Priority Data

Jan. 31, 1984 [JP] Japan .................................. 59-10953[U]

[51] Int. Cl.$^4$ .................................................... F16D 15/00
[52] U.S. Cl. .................................... 192/41 A; 192/45.1
[58] Field of Search ................... 192/41 A, 45.1; 188/82.8

[56] References Cited

U.S. PATENT DOCUMENTS

| | | | |
|---|---|---|---|
| 2,677,449 | 5/1954 | Wavak | 192/45.1 |
| 2,753,027 | 7/1956 | Troendly et al. | 192/45.1 |
| 2,832,450 | 4/1958 | Wade | 192/45.1 |
| 3,613,846 | 10/1971 | Zlotek | 192/41 A |
| 3,729,076 | 4/1973 | de Lavalette | 192/41 A |
| 4,089,395 | 5/1978 | Fogelberg | 192/41 A |
| 4,327,822 | 5/1982 | Vogele et al. | 192/41 A |

FOREIGN PATENT DOCUMENTS 2486606 1/1982 France .................................. 192/41 A

*Primary Examiner*—Rodney H. Bonck
*Assistant Examiner*—Alan G. Towner
*Attorney, Agent, or Firm*—Shapiro and Shapiro

[57] ABSTRACT

This specification discloses a one-way clutch rolling member holder for holding a plurality of rolling members disposed between the annular inner surface of an outer race and the annular outer surface of an inner race and intermittently transmitting a torque, characterized in that the holder has a plurality of holding surfaces disposed between the rolling members, and some or all of the holding surfaces have a planar portion bearing against the annular inner surface of the outer race or the annular outer surface of the inner race. The specification also disclosed a one-way clutch having such holder.

8 Claims, 10 Drawing Figures

ONE-WAY CLUTCH ROLLING MEMBER HOLDER AND ONE-WAY CLUTCH HAVING THE HOLDER

BACKGROUND OF THE INVENTION

1. Field of the Invention

This invention relates to a one-way clutch rolling member holder and a one-way clutch utilizing the holder, and more particularly to improvements in a holder for holding the sprags of a one-way clutch.

2. Description of the Prior Art

A one-way clutch is comprised of an outer race having an annular inner surface, an inner race having an outer surface corresponding to and concentric with the inner surface, a plurality of sprags disposed in an annular space formed between the inner and outer surfaces, and a holder for holding the sprags in a predetermined position. As an example of such holder, there is one known holder in which rectangular holes for holding sprags are formed at equal intervals on the circumference of an annular band member.

In such a one-way clutch, frictional force imparting means is sometimes provided between the holder and the driving race to more reliably transmit to the sprags the movement of the driving race when it is suddenly accelerated or decelerated or rotates at a high speed. For example, it is known to suitably dispose a drag clip having a biasing force as the frictional force imparting means or to provide the holder with a T-shaped bar 1 as shown in FIG. 1 of the accompanying drawings.

The T-shaped bar 1, as shown in FIG. 1, has one of the band portions in the circumferential direction of two adjacent rectangular holes cut to form a T-shaped portion, which is bent toward the track surface of the driving race (the inner surface of the outer race or the outer surface of the inner race). The head of this T-shaped bar 1 bears against the track surface during assembly and imparts a frictional force.

In such conventional T-shaped bar type frictional force imparting means, it is necessary to provide a number of T-shaped bars 1 in order to impart a high frictional force, but in that case, there is a disadvantage that the rigidity of the holder is reduced or the accuracy of the rectangular holes for holding the sprags is reduced.

Also, as shown in FIG. 2 of the accompanying drawings, end bearings 2 of U-shaped cross-section are sometimes mounted between the outer race and the inner race, but if T-shaped bars 1 are present in the holder, the heads thereof will prevent the end bearings 2 from being mounted.

On the other hand, if a number of drag clips are disposed as the frictional force imparting means, it will result in an increased cost or require special work for assembly, and this is disadvantageous.

SUMMARY OF THE INVENTION

It is an object of the present invention to eliminate the above-noted disadvantages peculiar to the holders according to the prior art and to provide an inexpensive holder which can impart any frictional force and which is not affected in rigidity and accuracy and does not hinder mounting of end bearings.

The present invention achieves the above object by a one-way clutch holder for holding a number of rolling members disposed between the annular inner surface of an outer race and the annular outer surface of an inner race and intermittently transmitting a torque, the holder having a plurality of holding surfaces disposed between the rolling members, some or all of the holding surfaces having a planar portion or a curved portion bearing against the annular inner surface of the outer race or the annular outer surface of the inner race.

DESCRIPTION OF THE PREFERRED EMBODIMENTS

Some embodiments of the present invention will hereinafter be described.

Figure 1:
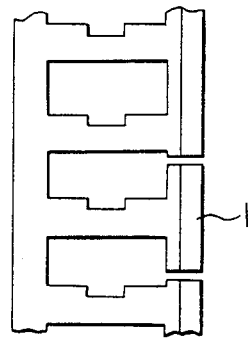
FIG. 1 is a fragmentary front view showing a conventional holder having a T-shaped bar.
Figure 2:
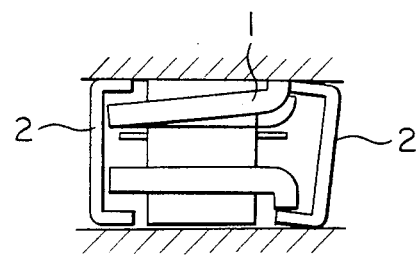
FIG. 2 a cross-sectional view of a one-way clutch having the holder of FIG. 1.
Figure 3:
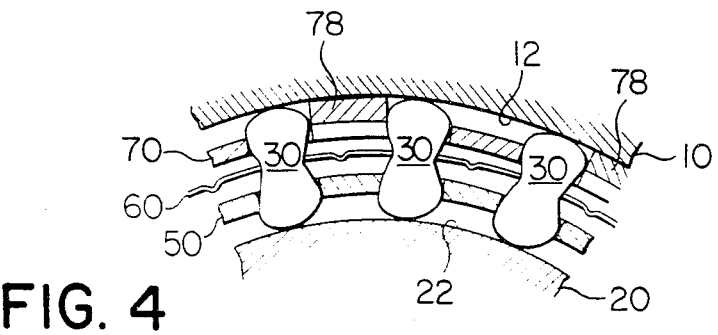
FIG. 3 is a fragmentary cross-sectional side view of a one-way clutch having a holder according to an embodiment of the present invention.

FIG. 3 shows a one-way clutch having a retainer according to the present invention. This one-way clutch comprises an outer race 10 having an annular inner surface 12, an inner race 20 having an outer surface 22 opposed to and concentric with the annular inner surface 12, a plurality of sprags 30 arranged circumferentially between the inner surface 12 and the outer surface 22 and serving to transmit a torque, an outer holder 70 and an inner holder 50 acting as the holding means for the sprags 30, and a biasing spring 60.

Figure 4:
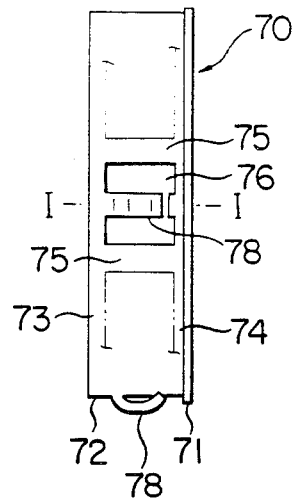
FIG. 4 is a front view of the outer holder of FIG. 3.
Figure 5:
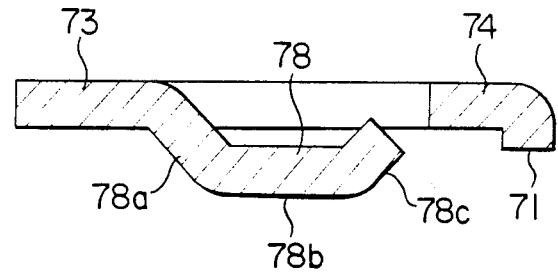
FIG. 5 is a cross-sectional view taken along line I—I of FIG. 4.

The outer holder 70 showing an embodiment of the present invention, as shown in FIGS. 4 and 5, has an annular peripheral surface portion 72 concentric with the outer race 10 or the inner race 20, and a flange 71 standing upright on one end of the peripheral surface portion 72 and having a slight height. The peripheral surface portion 72 comprises two parallel annular band portions 73 and 74 for holding the sprags 30 from the left and right thereof, and a plurality of connecting portions 75 connecting these band portions 73 and 74 and acting as holding surfaces for holding the front and rear of the sprags 30. Accordingly, the annular band portions 73 and 74 and the connecting portions form circumferentially arranged rectangular holes 76 for holding the sprags. A part of each connecting portion 75 is cut on the side thereof which is adjacent to the band portion 74, and is bent so as to have a planar portion 78b which bears against the inner surface 12 of the outer race 10 thereby forming frictional force imparting means 78. The frictional force imparting means 78 comprises an inclined portion 78a bent from the band portion 73 toward the outer race 10, a planar portion 78b bearing against the inner surface 12, and an end portion 78c bent toward the inner race 20 and having a distal end opposed to the band portion 74.

Figure 6:
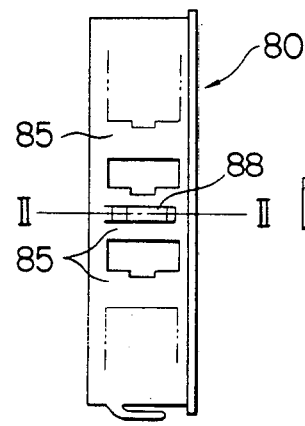
FIG. 6 is a front view of an outer holder according to a second, embodiment of the present invention.
Figure 7:
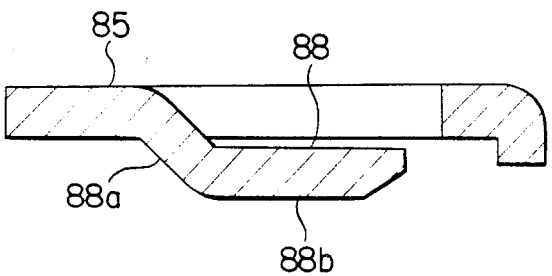
FIG. 7 is a cross-sectional view taken along line II—II FIG. 6

FIGS. 6 and 7 show an outer holder 80 according to a second embodiment of the present invention. The outer holder 80 is substantially identical in construction to the outer holder 70 shown in FIGS. 4 and 5 with the exception that the width of the connecting portion 85 thereof as a holding surface is greater than in the outer holder 70 and frictional force imparting means 88 is formed by bending a part of the connecting portion 85. The frictional force imparting means 88 comprises an inclined portion 88a formed by bending a part of the planar portion of the connecting portion 85 and inclined toward the outer race 10, and a planar portion 88b connected to the inclined portion 88a and bearing against the inner surface 12 of the outer race 10.

Figure 8:
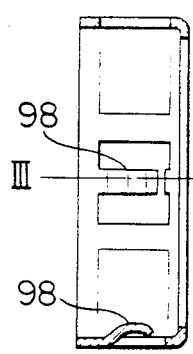
FIG. 8 is a front view showing an embodiment in which the present invention is applied to an inner holder.
Figure 9:
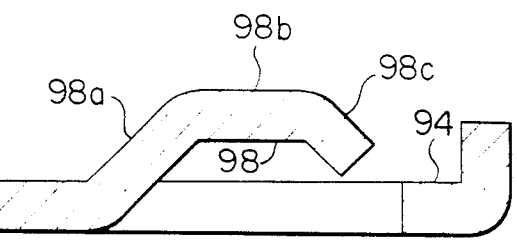
FIG. 9 is a cross-sectional view taken along line III—III of FIG. 8.

FIGS. 8 and 9 show an embodiment in which the present invention is applied to the inner holder. Frictional force imparting means 98 similar to that of the outer holder 70 shown in FIGS. 4 and 5 is provided on the inner holder 90 so as to bear against the inner race 20. The frictional force imparting means 98 comprises an inclined portion 98a inclined toward the inner race, a planar portion 98b, and an end portion 98c inclined toward a band portion 94.

FIG. 3 shows a state in which the outer holder 70 having the frictional force imparting means 78 according to the present invention is assembled to a one-way clutch. In the form shown, the planar portion 78b bears against the inner surface 12 of the outer race 10, whereby the frictional force imparting means 78 is flexed and a frictional force is produced by the biasing force thereof.

When the driving race of the one-way clutch, for example, the outer race 10 in FIG. 3, rotates in a non-torque-transmitting direction (the clockwise direction as viewed in FIG. 3), the outer holder 70 is also rotated therewith by the frictional force thereof to thereby bring the sprags 30 to their non-engaged position and hold them in this position. On the other hand, when the outer race 10 rotates in a torque-transmitting direction (the counter-clockwise direction as viewed in FIG. 3), the outer holder 70 is also rotated therewith to thereby hold the sprags 30 stably in their engaged position, so that the sprags transmit a torque.

In the holder of the present invention as described above, the frictional force with respect to the outer race or the inner race can be adjusted to any value by an increase or decrease in number of the frictional force imparting means formed on the connecting portions, variations in area and shape of the planar portion bearing against the outer race or the inner race, the adjustment of the biasing force by changing the height of the planar portion from the band portion, etc.

The present invention not only can be used for one or both of the outer holder and the inner holder, but also in a one-way clutch having a single holder, frictional force imparting means can be provided and utilized on that side thereof which requires a frictional force.

Further, in the foregoing description of the embodiments of the present invention, one end of the frictional force imparting means has been described as a cut end, whereas this end need not always be cut but may be connected to the annular band portion as is the other end. In such an arrangement, the entire holder flexes and produces a biasing force.

Figure 10:
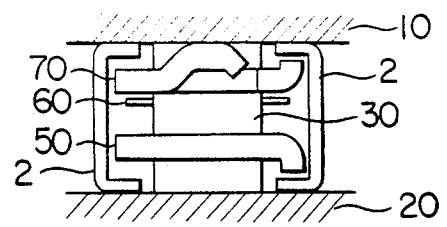
FIG. 10 is a cross-sectional view showing a state in which end bearings are mounted in the one-way clutch shown in FIG. 3.

As described above, the holder of the present invention can be made to have high rigidity and high accuracy by simple working similar to that effected on the conventional T-shaped bar type holder and permits any frictional force to be set between the holder and the outer race or the inner race and therefore operates reliably even if the driving race is suddenly accelerated or decelerated or rotates at a high speed. Further, the holder of the present invention does not require a drag clip or the like, and this leads to the possibility of greatly reducing the cost and shortening the assembling work. Furthermore, a one-way clutch having the holder of the present invention has an advantage that end bearings can be readily mounted therein as shown in FIG. 10.

We claim:

1. A one-way clutch comprising:
    (a) an outer race having an annular inner surface;
    (b) an inner race having an annular outer surface and disposed coaxially with said outer race;
    (c) a plurality of sprags spaced circumferentially at a predetermined interval between said inner surface and said outer surface, and engageable with said inner surface and said outer surface by tilting in a peripheral direction of said surfaces to transmit a torque between said two races; and
    (d) a sprag holder for holding said sprags in an annular space between said annular surfaces, said sprag holder including:
        (i) two annular band portions for supporting both sides of said sprags with respect to said peripheral direction, between said inner surface and said outer surface; and
        (ii) connecting portions for connection said two annular band portions, said connecting portions being positioned between said sprags and supporting the front and the rear of said sprags with respect to said peripheral direction, said connecting portions having friction engagement means frictionally engaged with one of said inner surface and said outer surface;
        said friction engagement means having a bearing portion bearing against said one surface, an extending portion extending between one end of said bearing portion and one of said two band portions, and a free end portion provided at another end of said bearing portion;
        said bearing portion, said extending portion, and said free end portion being aligned in an axial direction of said annular bands.

2. A one-way clutch according to claim 1, wherein said bearing portion bears against said inner surface of the outer race.

3. A one-way clutch according to claim 1, wherein said bearing portion bears against said outer surface of the inner race.

4. A one-way clutch according to claim 1, wherein said free end portion is directed toward the other of said two band portions.

5. A sprag holder for holding sprags in a one-way clutch which includes:
    (a) an outer race having an annular inner surface:
    (b) an inner race having an annular outer surface and disposed coaxially with said outer race; and
    (c) a plurality of sprags spaced circumferentially at a predetermined interval between said inner surface and said outer surface, and engageable with said inner surface and said outer surface by tilting in a peripheral direction of said surfaces to transmit a torque between said two races;
    said sprag holder comprising:

(i) two annular band portions for supporting both sides of said sprags with respect to said peripheral direction, between said inner surface and said outer surface; and (ii) connecting portions for connecting said two annular band portions, said connecting portions being positioned between said sprags and supporting the front and the rear of said sprags with respect to said peripheral direction, said connecting portions having friction engagement means frictionally engaged with one of said inner and outer surfaces;

said friction engagement means including a bearing portion bearing against said one surface, an extending portion extending between one end of said bearing portion and one of said two band portions, and a free end portion provided at another end of said bearing portion;

said bearing portion, said extending portion, and said free end portion being aligned in an axial direction of said annular bands.

6. A sprag holder according to claim 5, wherein said bearing portion bears against said inner surface of the outer race.

7. A sprag holder according to claim 5, wherein said bearing portion bears against said outer surface of the inner race.

8. A sprag holder according to claim 5, wherein said free end portion is directed toward the other of said two band portions.

* * * * *